UNITED STATES PATENT OFFICE.

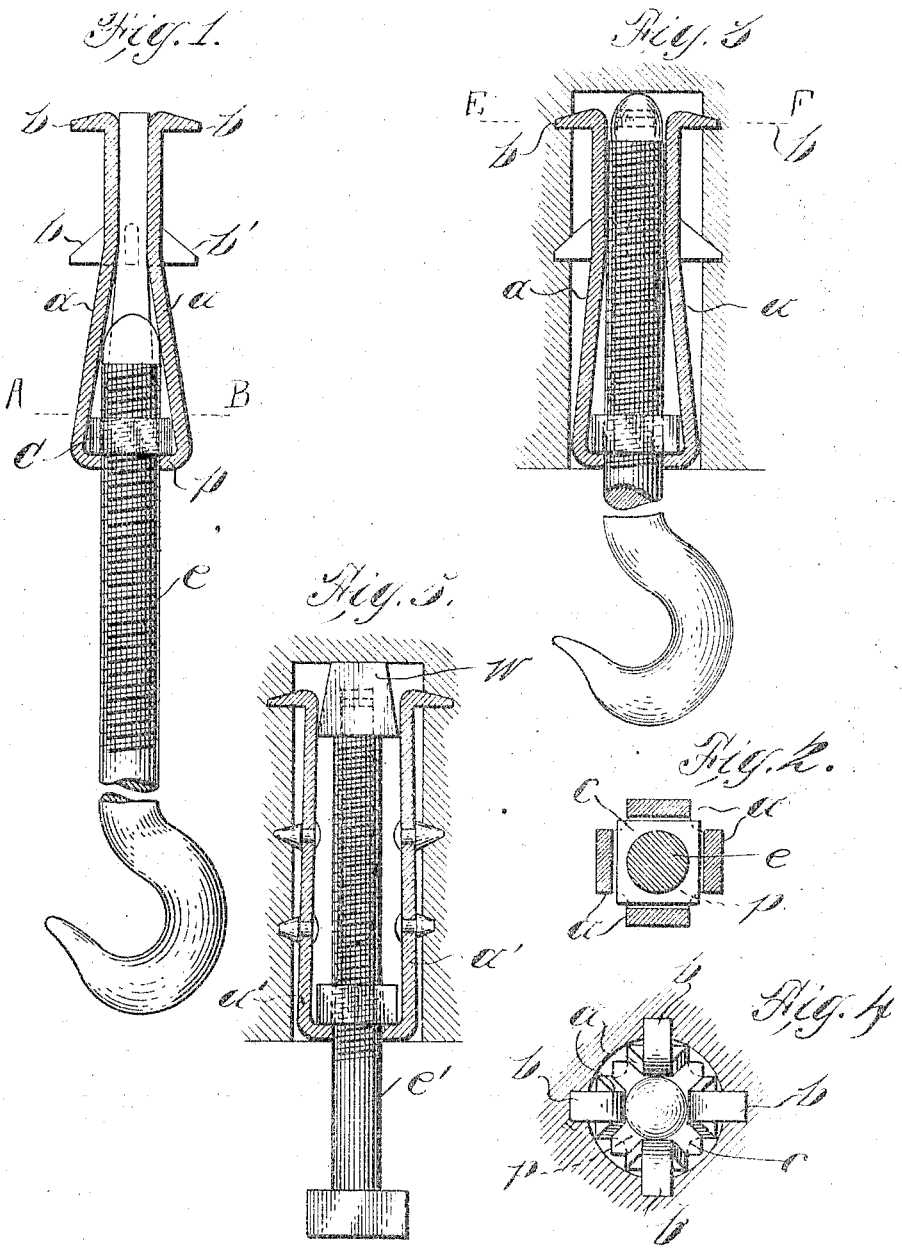

FRÉDÉRIC DE MORSIER, OF GENEVA, SWITZERLAND.

EXPANSION CRAMP DEVICE.

No. 811,163. Specification of Letters Patent. Patented Jan. 30, 1906.

Application filed March 8, 1905. Serial No. 249,107.

*To all whom it may concern:*

Be it known that I, FRÉDÉRIC DE MORSIER, a citizen of the Republic of Switzerland, residing at Geneva, Switzerland, have invented certain new and useful Improvements in Expansion Cramp Devices, of which the following is a clear, full, and exact description.

The object of my invention is to provide a simple, cheap, and practical expansion cramp device for securing a purchase within a plane surface against longitudinal pull—such, for instance, as is adapted to secure a hook in a wall.

In carrying out my invention I provide a number of legs of metal substantially parallel to each other, free at their outer ends, and joined at their butt-ends, each such set being of V shape. These plural legs may with advantage be stamped out of one sheet of metal. At the butt-end of the legs where they join each other I insert through a suitable opening a threaded screw to act as an expansive member, either alone or with an independent expansion-plug. The screw is adapted to be rotated without rotating the sets of legs, but to advance longitudinally between them as a result of this rotation. In my preferred construction I bend the legs at right angles where they join, and within the square thus formed I locate a collar or nut, so fitting between the legs as not to turn. Thus I secure a simple advancing means for the threaded screw. The legs along their outer sides may be provided with projections to take into the sides of the hole into which they are to be inserted. The projections may be one or more on each leg. When more than one, I prefer to graduate their lengths, the projection nearest the free end of the leg being of greater length than the one near the butt-end.

In the accompanying drawings, Figure 1 is a central longitudinal sectional view of an unattached device of my invention. Fig. 2 is a section on the line A B of Fig. 1. Fig. 3 is a view similar to Fig. 1 with the device in secured position. Fig. 4 is a plan on the line E F of Fig. 3, and Fig. 5 is a view similar to Fig. 3 of a modified form of device.

The device of Figs. 1 to 4, inclusive, is shown as composed of four legs *a*, each provided at its free end with a projection *b* and at a distance from its free end with a projection *b'*. Each pair of legs forms a letter V, being joined at right angles at their butt-ends to a perforated holding-plate *p*, which may well be integral with the legs. The inner half lengths of the legs are preferably formed nearer together than their butt-ends. Within the polygonal space formed by these legs where they join the plate *p* I locate a collar or nut *c*, shaped to conform to the shape of said space, and I pass a screw-spindle *e* through the perforated plate, so as to screw into the nut.

All parts of the device shown in Fig. 1 are of less diameter than the hole which is to receive them, so the device can be readily inserted into it. When this has been done, the screw is revolved, causing its end, which I have shown as a wedge, to press the inner ends of the legs apart to cause their projections to be forced into the wall of the opening in an obvious manner.

The device of Fig. 5 only differs from that just described in that an independent wedge *w* is used to coöperate with the screw *e'* and the legs *a'* are formed of gradual taper instead of with the more arcuate taper in their mid-portions, as shown in the figures hereinbefore described.

I claim as my invention—

An expansion device comprising at least a pair of legs of sheet metal extending in the same general direction joined at their butt-ends and bent toward each other so as to be closer together at their free ends than at their butt, a nut in the butt-end, so fitting therein as to be embraced by the legs to prevent its rotation and a screw passing through the nut.

Signed at Geneva, Switzerland, this 23d day of February, 1905.

FRÉDÉRIC DE MORSIER.

Witnesses:
J. MOTTIER,
HORACE LEE WASHINGTON.